US012213634B2

(12) United States Patent
Weber et al.

(10) Patent No.: US 12,213,634 B2
(45) Date of Patent: Feb. 4, 2025

(54) MAGNETIC VERTICAL AXIS ROTARY CLEAN OFF ATTACHMENT APPARATUS

(71) Applicant: Bluestreak Equipment Inc., Delhi (CA)

(72) Inventors: Brian Weber, Delhi (CA); Shuyue Zhang, Delhi (CA)

(73) Assignee: BLUESTREAK EQUIPMENT INC.

( * ) Notice: Subject to any disclaimer, the term of this patent is extended or adjusted under 35 U.S.C. 154(b) by 0 days.

(21) Appl. No.: 18/398,023

(22) Filed: Dec. 27, 2023

(65) Prior Publication Data

US 2024/0215793 A1 Jul. 4, 2024

Related U.S. Application Data

(60) Provisional application No. 63/477,412, filed on Dec. 28, 2022.

(51) Int. Cl.

| | |
|---|---|
| ***A47L 13/41*** | (2006.01) |
| ***B03C 1/033*** | (2006.01) |
| ***B03C 1/24*** | (2006.01) |
| ***H01F 7/02*** | (2006.01) |

(52) U.S. Cl.
CPC ............ *A47L 13/41* (2013.01); *B03C 1/0332* (2013.01); *B03C 1/24* (2013.01); *H01F 7/02* (2013.01); *B03C 2201/20* (2013.01)

(58) Field of Classification Search
CPC ......... A47L 13/41; B03C 1/0332; B03C 1/24; B03C 2201/20; B03C 1/30; H01F 7/02
See application file for complete search history.

(56) References Cited

U.S. PATENT DOCUMENTS 6,158,792 A * 12/2000 Snider ........................ B03C 1/30 209/215
2016/0198924 A1* 7/2016 Pruiett ...................... A46B 3/20 15/104.8

* cited by examiner

*Primary Examiner* — Jacob S. Scott
*Assistant Examiner* — Miraj T. Patel

(57) ABSTRACT

A continuous discharge magnetic sweeper apparatus with a vertical axis rotary clean off attachment. The main magnetic sweeper consists of a handle, a back wheel, a frontal debris bin, a drive wheel and a finned drum housing a magnetic assembly. Magnetic debris is attracted by magnet assembly, accumulates on the finned drum and is deposited in the frontal debris bin. The vertical axis rotary clean off attachment connects to the magnetic sweeper and consists of a main frame body, a mounting feature, a support wheel, a rotary cap and a finned driving wheel. The finned driving wheel is a hollow finned wheel driven by contact with a wall, assisting the magnetic field to move shot from the wall side into the main sweeper's range to be picked up by the main sweeper apparatus.

18 Claims, 10 Drawing Sheets

| Distance (A) | Ground Level |
|---|---|
| Gauss (G) | 466 |

Note: Gauss (G) shows the maximum gauss measured on the bottom of the sweeper.

MAGNETIC VERTICAL AXIS ROTARY CLEAN OFF ATTACHMENT APPARATUS

CROSS REFERENCE TO RELATED APPLICATIONS

This application claims priority to and the benefit of U.S. Provisional Application Ser. No. 63/477,412, entitled "MAGNETIC VERTICAL AXIS ROTARY CLEAN OFF ATTACHMENT APPARATUS", filed on Dec. 28, 2022, the disclosure of which is incorporated herein by reference in its entirety.

BACKGROUND

The field of the disclosure relates to a sweeper apparatus, in particular to a vertical axis rotary clean off attachment apparatus.

The commercial shot blasting industry uses small steel shot (balls) projected at the floor at high velocity by shot blasting machines for surface preparation. Common applications include but are not limited to traction control, cleaning, or the application of floor coatings. The steel shot can be hazardous (slippery), can create defects in coatings if not collected, and can also leave unsightly rust stains and flawed finishes if it is not collected.

The steel shot is most often collected by magnetic sweepers. A magnetic sweeper apparatus utilizes magnetism to pick up ferrous or metallic objects. However, most magnetic sweepers have difficulties picking up metal debris near wall edges and in corners.

A typical horizontal axis continuous discharge sweeper has a debris bin in front of the sweeper, as well as a dead spot between the end of the magnet and the end of the product, and therefore cannot get close to walls on the side or on the front of the sweeper. Also, the common flip-up clean off sweepers have a clearance in the front side for the magnets to flip up, so they cannot get close enough to walls to pick up steel shot near the edge.

There is a desire to provide an improved magnetic sweeper that addresses one or more of these problems.

SUMMARY

A magnetic vertical axis rotary clean off attachment apparatus. The magnetic vertical axis apparatus consists of a main body, a finned driving wheel, mounting features, support wheel, axle assembly and magnet assembly. The magnetic vertical axis rotary clean off attachment apparatus design utilizes field differences, created by the magnet positioning, and strength to achieve the automatic pick-up and drop-off of debris at the bottom of the finned driving wheel. The finned driving wheel is a hollow finned wheel driven by contact with a wall, assisting the magnetic field to move shot from the wall side into the main sweeper's range to be picked up by the main sweeper.

The magnetic vertical axis rotary clean off attachment apparatus can connect to a main sweeper which can be of the traditional magnetic sweeper design or to a horizontal axis continuous discharge magnetic sweeper. In some cases the apparatus may be connected to a vacuum or other sweeping/cleaning apparatus.

DETAILED DESCRIPTION

According to the disclosure, a device that picks up steel shot from the floor near wall edges and moves the shot over into a location from where a main magnetic sweeper can easily collect it is disclosed. A vertical axis continuous discharge sweeper solves the problem of many magnetic sweepers having difficulties picking up shot near wall edges and corners.

The operation of the apparatus is as follows. For this vertical axis continuous discharge system, a change in magnetic field is created by sizing and arranging stationary magnets to achieve the steel shot pick-up and relocation function. After simulations and tests, a suitable size and arrangement composition of rare earth magnets can achieve the desired result.

Furthermore, a finned disc/wheel that rotates on a vertical axis to help transfer and direct the steel shot from the floor along a wall side to a location where it can be picked up by a main magnetic sweeper. The drum is driven by the contact with the wall, while the magnets stay stationary inside.

According to the disclosure, a vertical axis continuous discharge sweeper apparatus is meant to attach as a separate accessory to a horizontal axis continuous discharge magnetic sweeper of corresponding size.

An alternate embodiment would be a horizontal axis continuous discharge sweeper with only a wheel on one end. The side without the wheel can get close to the wall, the other side with the wheel will drive the sweeper. Anything picked up by the sweeper will be discharged into a chute, which can allow the picked up material to slide from the wall side towards a main sweeper apparatus.

Figure 1:
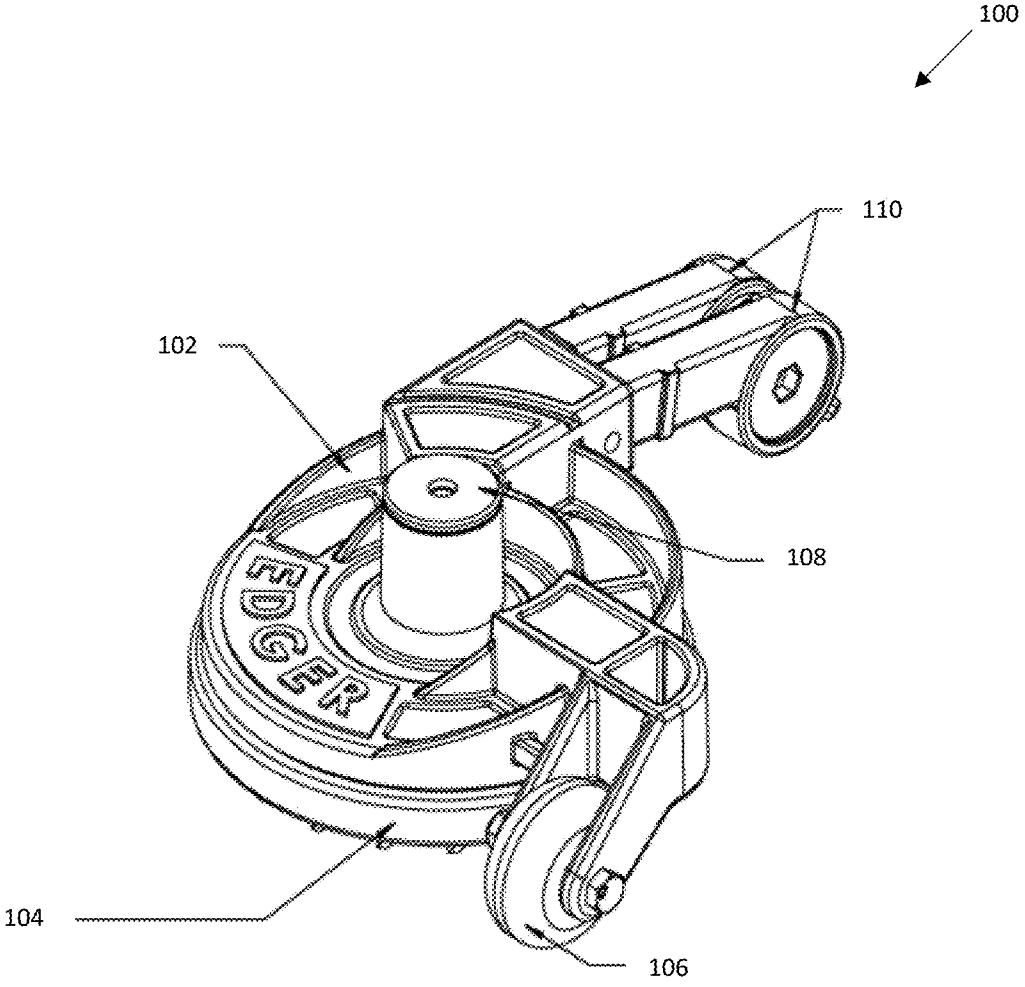
FIG. 1 is a line diagram of a perspective view of a magnetic vertical axis rotary clean off attachment apparatus.

FIG. 1 is a line diagram of a perspective view of a magnetic vertical axis rotary clean off attachment apparatus. According to FIG. 1, a vertical axis continuous discharge sweeper apparatus 100 consists of a main body 102, a finned driving wheel 104, a support wheel 106, a rotary cap 108 and a mounting arm 110.

According to FIG. 1, the main body 102 forms the frame of the product. The finned driving wheel 104 is a hollow wheel which is finned on the bottom and is driven by contact with the wall, assisting the magnetic field to move shot from the wall side into the main sweeper's range.

According to FIG. 1, the support wheel 106 provides balance and stabilizes sweeping height. The rotary cap 108 is an aluminum cap covering the bearing and axle to prevent the shot from getting inside. Finally, the mounting arms 110 provide a connection to the frame of a magnetic sweeper.

Figure 2:
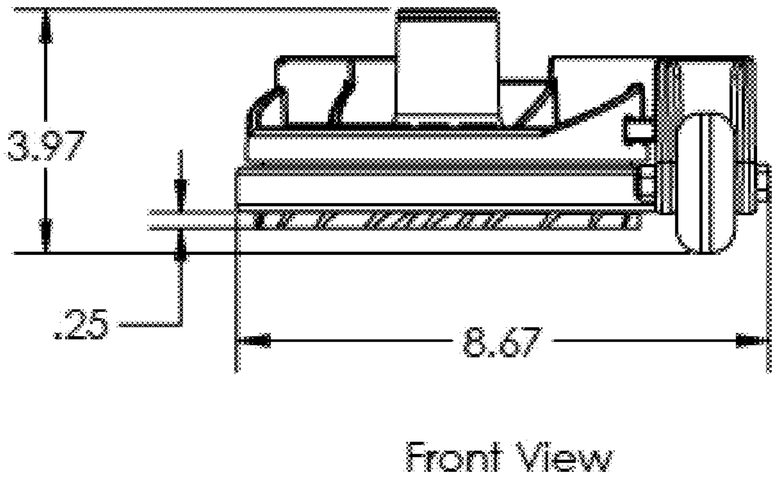
FIG. 2 is a line diagram of a front view of a magnetic vertical axis rotary clean off attachment apparatus.

FIG. 2 is a line diagram of a front view of a magnetic vertical axis rotary clean off attachment apparatus. According to FIG. 2, the dimensions of the apparatus are 8.67" wide by 3.97" height with a fin height of 0.25". Furthermore, other dimensions can be considered for other embodiments of the apparatus.

Figure 3:
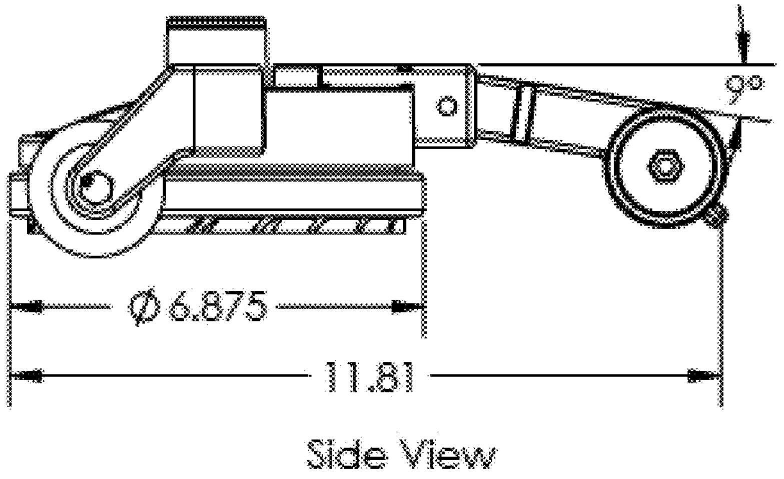
FIG. 3 is a line diagram of a right-side view of a magnetic vertical axis rotary clean off attachment apparatus.

FIG. 3 is a line diagram of a right-side view of a magnetic vertical axis rotary clean off attachment apparatus. According to FIG. 3, the right-side view has a finned driving wheel diameter of 6.875" and a total apparatus length of 11.81" from the front driving wheel to the furthest extent of the mounting arm. Other sizes can also be considered. Furthermore, the mounting arm has an angle of 9 degrees to aid in mounting to our magnetic sweepers; however, the angle is not critical to apparatus function and other angles can be considered.

Figure 4:
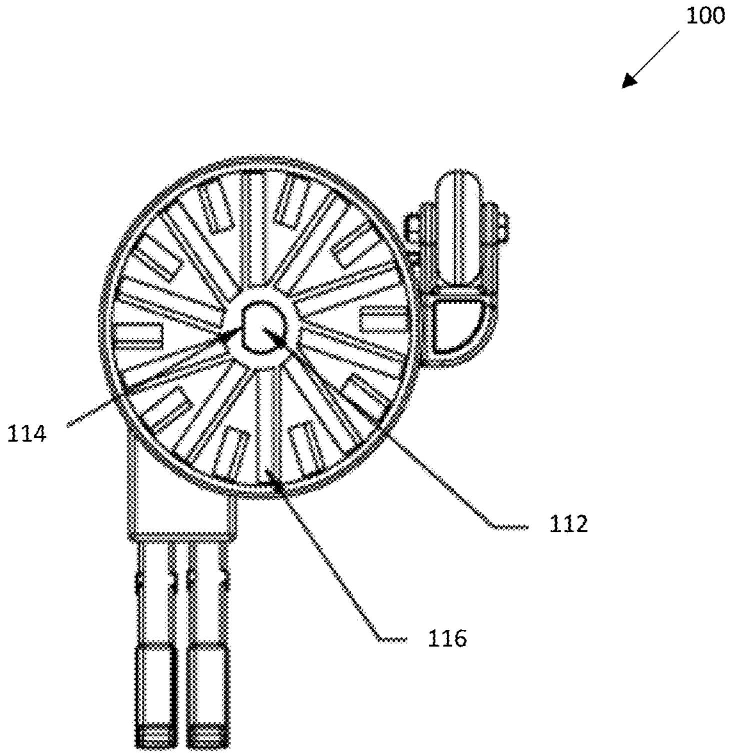
FIG. 4 is a line diagram of a bottom view of a magnetic vertical axis rotary clean off attachment apparatus.

FIG. 4 is a line diagram of a bottom view of a magnetic vertical axis rotary clean off attachment apparatus. According to FIG. 4, the bottom of the magnetic vertical axis rotary clean-off attachment apparatus 100 consists of an aluminum central axle 112 that is configured for locking to prevent slipping and ensure rotation of finned wheel transfer into bearings 114. Connected to the aluminum axle are 10 long and 10 short, 0.25" height, tilted fins 116. Other arrangements of fins can be considered in further embodiments of the apparatus.

Figure 5:
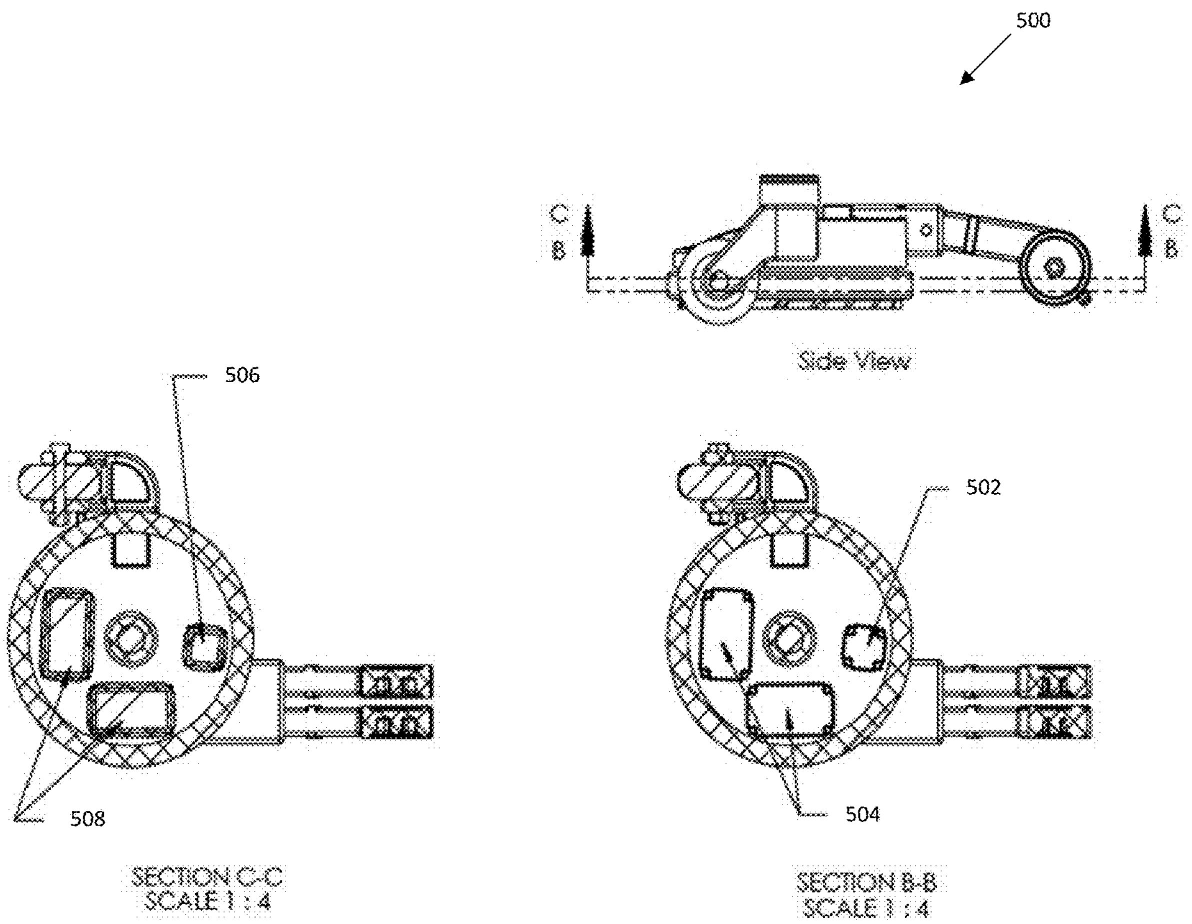
FIG. 5 is a line diagram of a sectional view magnet arrangement of a magnetic vertical axis rotary clean off attachment apparatus.

FIG. 5 is a line diagram of a sectional view of the magnet arrangement of a magnetic vertical axis rotary clean off attachment apparatus. According to FIG. 5, the sectional side view of section B-B and section C-C are shown of a magnetic vertical axis rotary clean off attachment apparatus 500. Section B-B shows a plurality of magnet retention covers 502 and 504. Section C-C shows the locations of rare earth magnets of different dimensions. Location 1 506 has a 1 rare earth magnet with dimensions of 0.375" length, 0.75" width and 0.75" height. Location 2 508 contains 2 rare earth magnets with dimensions of 0.5" length, 1" width and 2" height. Other magnet sizes, types and dimensions can also be considered for further embodiments of the apparatus.

Figure 6A:
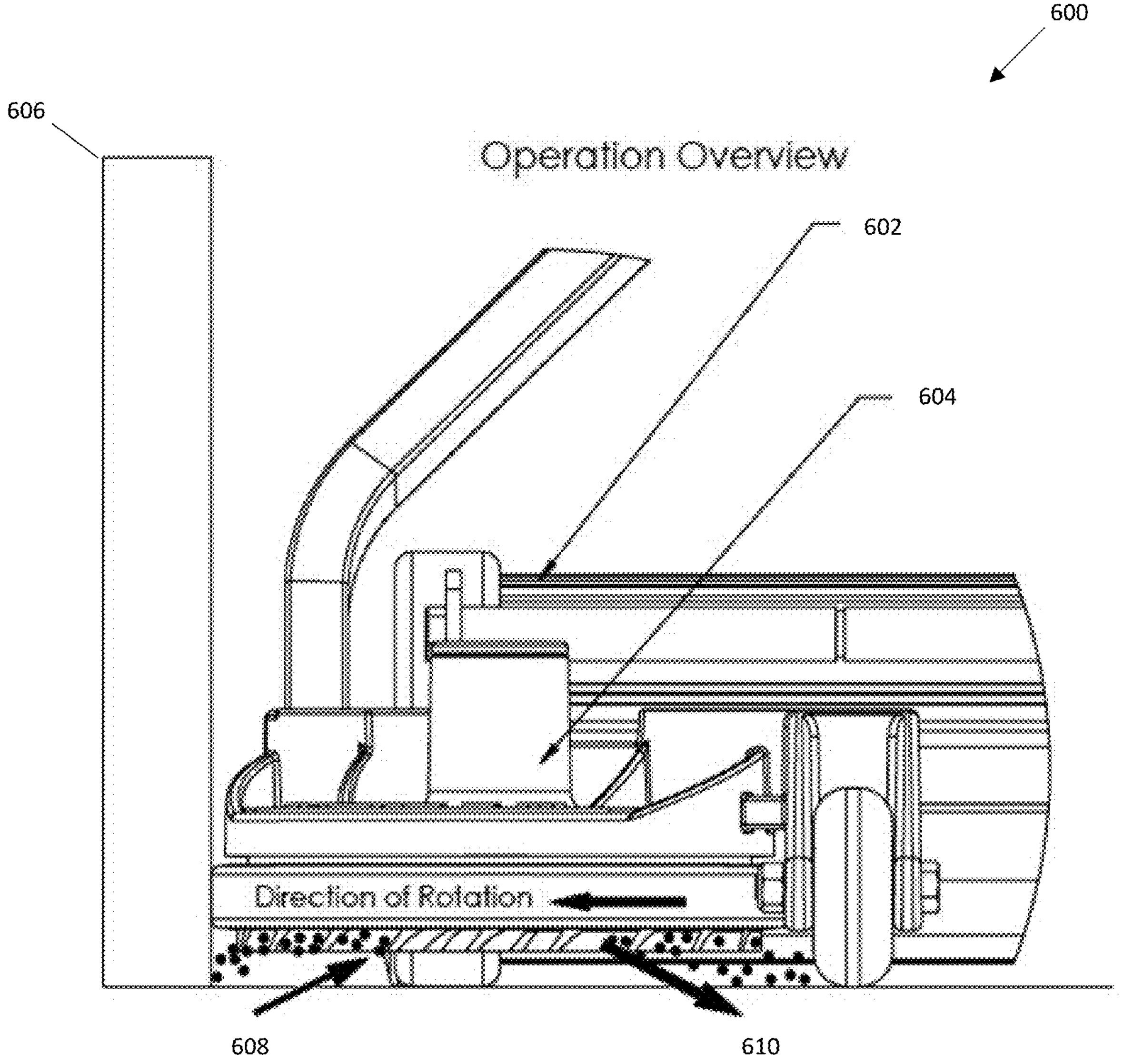
FIGS. 6A and 6B are line diagrams illustrating the operation overview of a magnetic vertical axis rotary clean off attachment apparatus.
Figure 6B:
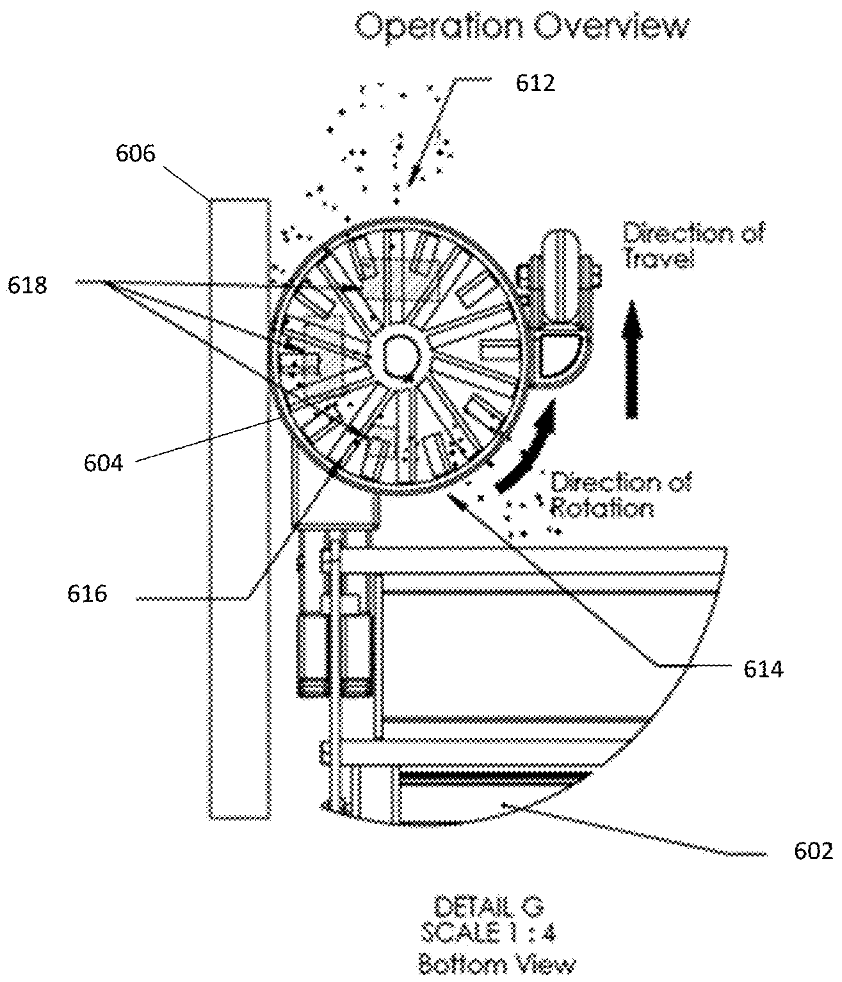

FIGS. 6A and 6B are line diagrams illustrating the operation overview of a magnetic vertical axis rotary clean off attachment apparatus. FIG. 6A is a line diagram 600 of an operation overview of a magnetic vertical axis rotary clean off attachment apparatus. According to FIG. 6A, a main magnetic sweeper 602 is connected to vertical axis rotary continuous discharge attachment sweeper apparatus 604 and is shown next to a wall 606. Steel shots 608 are picked up near the wall 606. The steel shots 608 are dropped off at the inner side 610 which will be picked up by the main magnetic sweeper 602. The main magnetic sweeper 602 can be a continuous discharge or traditional design. Continuous discharge sweepers have a rotary drum to continuously clean off during operation. Traditional sweepers are the flip up type where it only cleans shot off when the user stops and flips the magnet up.

FIG. 6B is a line diagram of a second operation overview of a magnetic vertical axis rotary clean off attachment apparatus. According to FIG. 6B, the main magnetic sweeper 602 and the magnetic vertical axis rotary clean off sweeper attachment 604 travel in the direction of travel as shown. Stray stationary steel shots 612 will be picked up by the sweeper attachment 604 and moved around within the sweeper in the direction of rotation until arriving at the discharge location 614. Long and short fins 616 within the sweeper attachment 604 help pull or carry the shot towards the discharge location 614 in the main magnetic sweeper's path.

According to FIG. 6B, the sweeper attachment 604 consists of rare earth magnet blocks 618 of different sizes. The steel shots 612 are discharged at a location 614 where the magnetic field weakens and will then be picked up by the main magnetic sweeper 602.

According to FIG. 6B, operation of the magnetic sweeper 602 and sweeper attachment 604 is as follows. The stationary rare earth magnet blocks 618 of different sizes create a transition in magnetic field. The steel shots 612 are picked up at the location with the stronger field and carried across the finned disc which is driven by contact with a wall 606 and is dropped off at the location 614 with a weaker field. Finally, the long and short fins 616 help to carry or pull the steel shots towards the discharge location, but also prevent the steel shot 612 from being pulled back by the stronger field.

Figure 7:
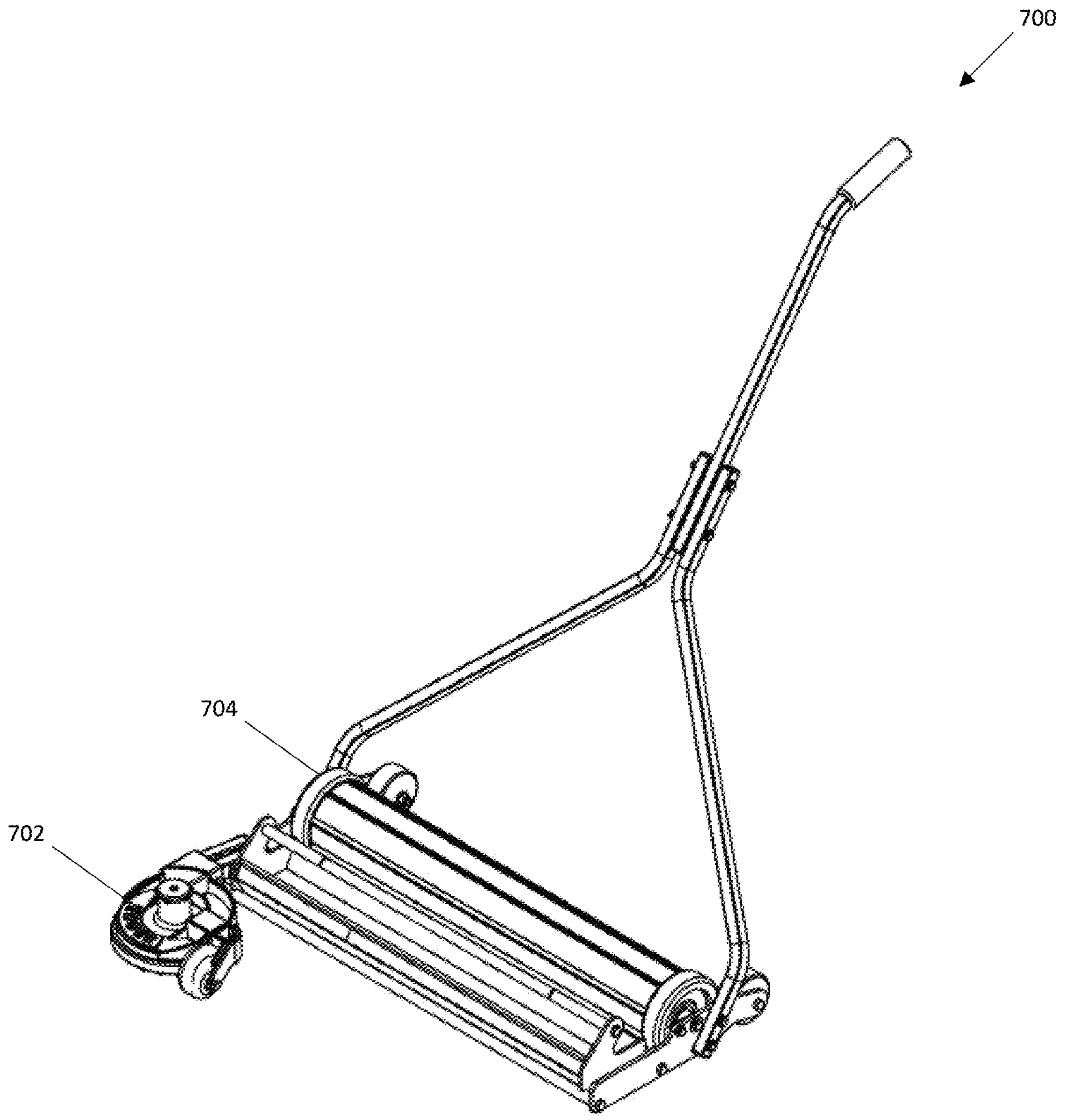
FIG. 7 is a line diagram of an isometric view of a combined magnetic vertical axis rotary clean off attachment connected to a magnetic sweeper apparatus.

FIG. 7 is a line diagram of an isometric view of a combined magnetic vertical axis rotary clean off attachment connected to a magnetic sweeper apparatus. According to FIG. 7, apparatus 700 includes the vertical axis rotary clean off sweeper attachment 702, connected to the right side of the magnetic sweeper apparatus 704.

Figure 8:
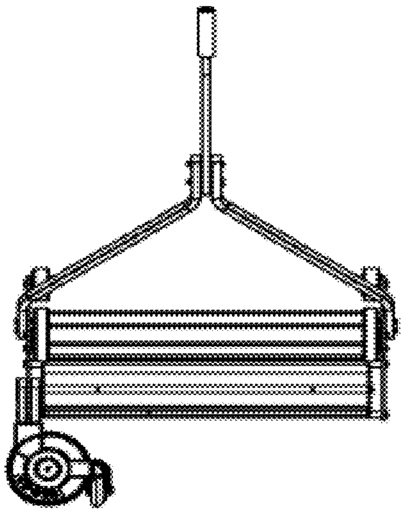
FIG. 8 is a line diagram of a top plan view of a combined magnetic vertical axis rotary clean off attachment connected to a magnetic sweeper apparatus.
Figure 9:
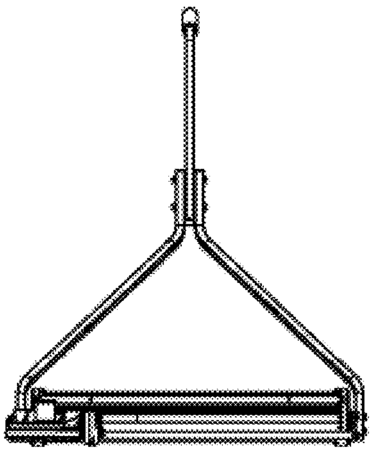
FIG. 9 is a line diagram of a front plan view of a combined magnetic vertical axis rotary clean off attachment connected to a magnetic sweeper apparatus.
Figure 10:
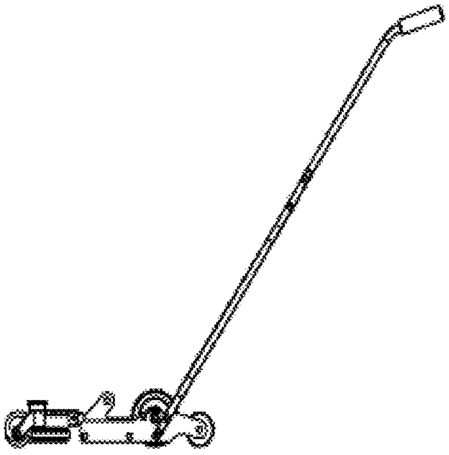
FIG. 10 is a line diagram of a right-side view of a combined magnetic vertical axis rotary clean off attachment connected to a magnetic sweeper apparatus.

FIGS. 8 to 10 are diagrams that illustrate multiple views of the combined magnetic vertical axis rotary clean off attachment connected to a magnetic sweeper apparatus. FIG. 8 is a line diagram of a top plan view. FIG. 9 is a line diagram of a front plan view. FIG. 10 is a line diagram of a right-side view.

Figure 11:
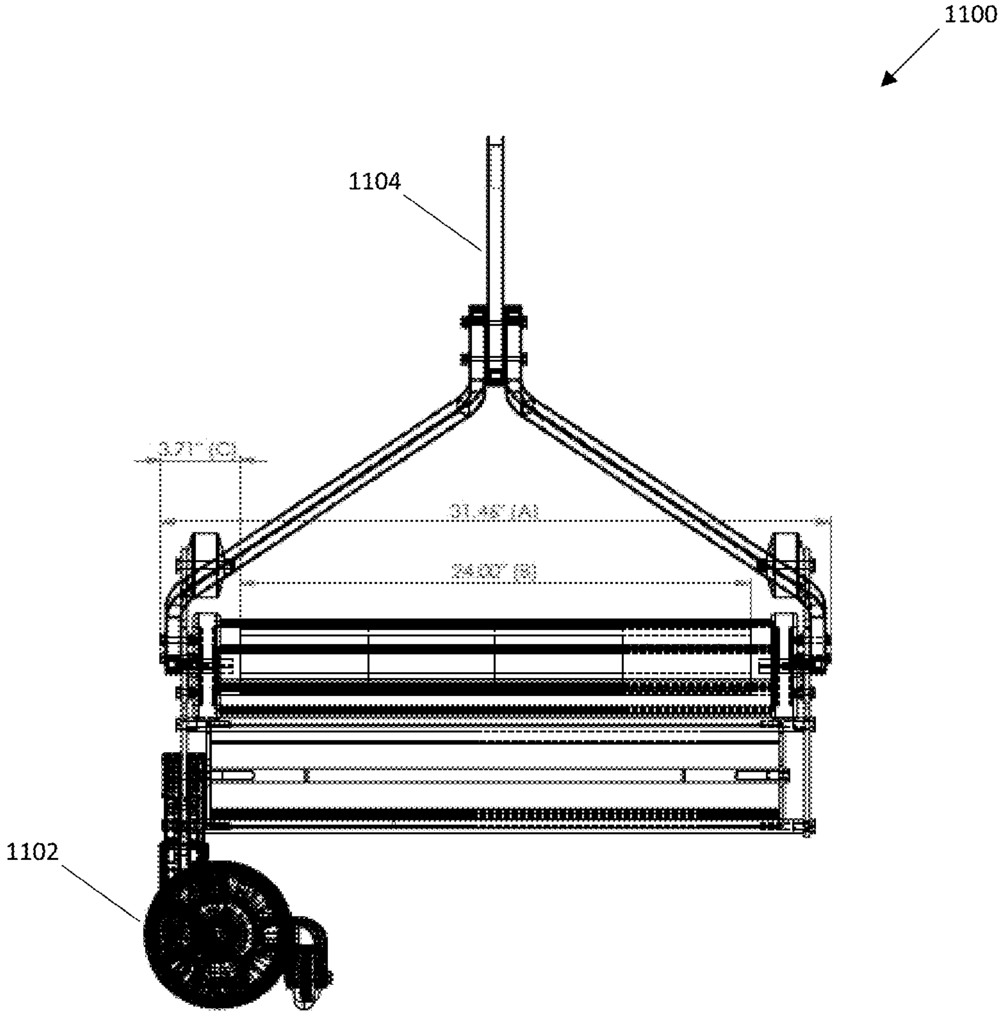
FIG. 11 is a line diagram of a close-up view of a combined magnetic vertical axis rotary clean off attachment connected to a magnetic sweeper apparatus.

FIG. 11 is a line diagram of a close-up view of a combined magnetic vertical axis rotary clean off attachment connected to a magnetic sweeper apparatus. According to FIG. 11, apparatus 1100 consists of magnetic vertical axis rotary clean off sweeper attachment 1102 connected to a magnetic sweeper apparatus 1104. According to FIG. 11, the total width of a horizontal axis continuous discharge magnetic sweeper apparatus 1102 is 31.46" (shown in A). The effective sweeping width is 24" width (shown in B). Furthermore, the dead spot which is solved by the magnetic vertical axis rotary clean off sweeper attachment 1102 is 3.71" wide (shown in C).

Figure 12:
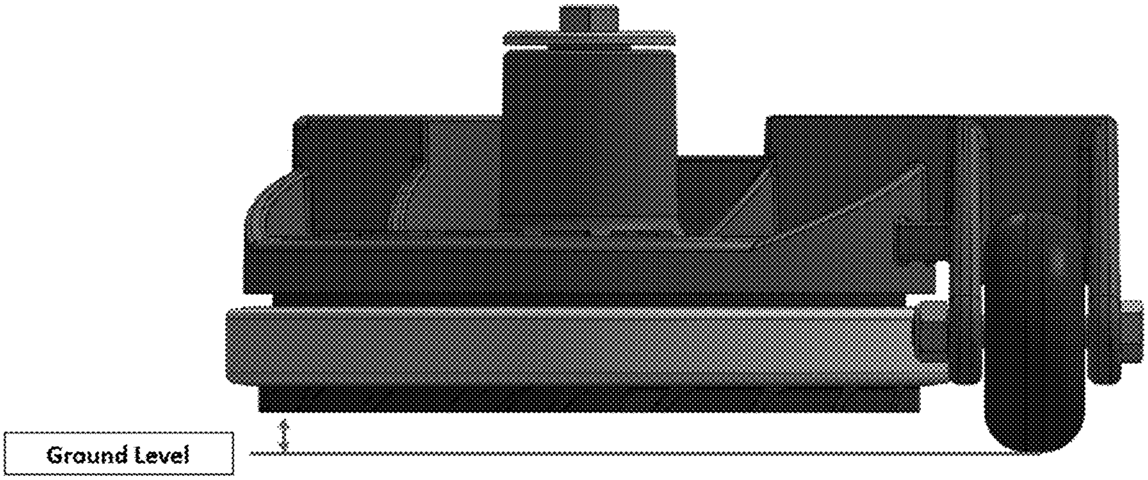
FIG. 12 is a diagram that illustrates the Gauss (G) measurements for the magnetic strength of the rare earth magnets.

FIG. 12 is a diagram that illustrates the Gauss (G) measurements for the magnetic strength of the rare earth magnets. According to the disclosure, the magnets can be Neodymium 42 rare earth magnets, Ceramic 8 magnets, or some other magnets or combination of magnets. FIG. 12 is a diagram that illustrates the Gauss (G) measurements for the magnetic strength of the Neodymium 42 rare earth magnets. According to FIG. 12, sweeping height A is the distance from the magnet. The following table (also shown in FIG. 12) illustrates the relationship between sweeping height and magnet strength (in Gauss):

| Distance A | Ground Level |
|---|---|
| Peak Gauss (G) | 466 |

According to further embodiments of the disclosure, a battery powered vertical axis unit of the same design to spin the rotary head instead of the wall driven wheel design can also be considered.

The vertical axis continuous discharge sweeper's main body and mountings are made of injection molded glass fiber reinforced plastic. This selection of material and manufacturing method are for achieving enough strength/rigidity, while also being able to have freedom in geometry. Other types of plastic could be considered for the body, though one would need to consult with injection molding engineers or expert in materials. The aluminum axle and rotary caps don't interfere with the magnetic field (aluminum is non-magnetic), have enough strength (metal vs. plastic) and reduce the weight of parts (compared with steel). The finned wheel uses TPE material for the tire (rubber like texture) for better gripping and used PP material for the core (plastic like texture) for strength and rigidity. Those materials are molded together for stronger connection. Other wheel materials could be considered based on consultation with experts.

According to the disclosure, a magnetic vertical axis rotary clean-off attachment apparatus, configured for attachment to a magnetic sweeper apparatus for collection of metallic debris is disclosed. The attachment apparatus comprises a main frame, a finned driving wheel, a support wheel, a rotary cap, a mounting feature and a plurality of magnet blocks of different sizes creates a transition in magnetic field. The finned driving wheel is a hollow finned wheel driven by contact with a wall, assisting the magnetic field to move metallic debris from the wall side into the magnetic sweeper apparatus' range to be picked up by the main sweeper apparatus.

According to the disclosure, the magnet blocks of the apparatus further comprises rare earth magnets or Ceramic 8 magnets. The metallic debris is steel shots. The dimensions of the magnet blocks are 2" length, 1" width and 0.5" height or 0.75" length, 0.75" width and 0.375" height. The dimensions are 11.81" length, 8.67" width and 3.97" height.

According to the disclosure, the steel shots are picked up at the location with the stronger magnetic field and carried across the finned disc which is driven by contact with a wall and is dropped off at the location with weaker magnetic field. The long and short fins of the apparatus helps to carry or pull the steel shots towards the discharge location, but also prevent the steel shot from being pulled back by the stronger field.

According to the disclosure, the steel shots are dropped off at the inner side which will be picked up by the main magnetic sweeper apparatus. The main magnetic sweeper apparatus is configured for continuous discharge or a traditional design discharge.

According to the disclosure, a method of removing metallic debris, using a combined vertical axis rotary clean-off attachment apparatus and a main magnetic sweeper apparatus is disclose. The method comprises the steps of attaching the attachment apparatus to the magnetic sweeper apparatus by a connecting part, driving the magnetic sweeper apparatus forward or backwards towards a wall, attracting metallic debris at the bottom of the attachment apparatus by magnetic forces, picking up and transferring metallic debris by the attachment apparatus with a finned driving wheel, placing the metallic debris behind the attachment apparatus at a discharge location, and picking up and discharging the metallic debris into a debris bin of the main magnetic sweeper apparatus.

According to the disclosure, the magnetic forces of the method are created by a plurality of magnets of different sizes that create a transition in magnetic field. The finned driving wheel of the method is a hollow finned wheel driven by contact with a wall, assisting the magnetic field to move metallic debris from the wall side into the magnetic sweeper apparatus' range to be picked up by the main sweeper apparatus.

According to the disclosure, the magnet blocks of the apparatus further comprises rare earth magnets or Ceramic 8 magnets. The metallic debris is steel shots. The dimensions of the magnet blocks are 2" length, 1" width and 0.5" height or 0.75" length, 0.75" width and 0.375" height. The dimensions are 11.81" length, 8.67" width and 3.97" height.

According to the disclosure, the steel shots of the method are picked up at the location with the stronger magnetic field and carried across the finned disc which is driven by contact with a wall and is dropped off at the location with weaker magnetic field. The long and short fins of the method helps to carry or pull the steel shots towards the discharge location, but also prevent the steel shot from being pulled back by the stronger field.

According to the disclosure, the steel shots of the method are dropped off at the inner side which will be picked up by the main magnetic sweeper apparatus. The main magnetic sweeper apparatus of the method is configured for continuous discharge or a traditional design discharge.

While some embodiments or aspects of the present disclosure may be implemented in fully functioning mechanical, electrical and electrical-mechanical systems, other embodiments may be considered.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The specific embodiments described above have been shown by way of example and understood is that these embodiments may be susceptible to various modifications and alternative forms. Further understood is that the claims are not intended to be limited to the forms disclosed, but to cover all modifications, equivalents, and alternatives falling within the spirit and scope of this disclosure. While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean “one and only one” unless explicitly so stated, but rather “one or more.” All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, various changes and modifications in form, material, workpiece, and fabrication material detail may be made, without departing from the spirit and scope of the present disclosure, as set forth in the appended claims, as may be apparent to those of ordinary skill in the art, are also encompassed by the present disclosure.

What is claimed is:

1. A magnetic vertical axis rotary clean-off attachment apparatus, configured for attachment to a magnetic sweeper apparatus for collection of metallic debris, the attachment apparatus comprising:

a main frame;

a finned driving wheel;

a support wheel;

a rotary cap;

a mounting feature; and a plurality of magnet blocks that create a transition in magnetic field;

wherein the finned driving wheel is a hollow finned wheel driven by contact with a wall or a structure, assisting the magnetic field to move metallic debris from the side of the wall into the magnetic sweeper apparatus' range to be picked up by the magnetic sweeper apparatus.

2. The apparatus of claim 1 wherein the magnet blocks further comprises rare earth magnets or Ceramic 8 magnets.

3. The apparatus of claim 1 wherein the metallic debris is steel shots.

4. The apparatus of claim 1 wherein the dimensions of the magnet blocks are 2" length, 1" width and 0.5" height or 0.75" length, 0.75" width and 0.375" height.

5. The apparatus of claim 1 wherein the dimensions of the apparatus are 11.81" length, 8.67" width and 3.97" height.

6. The apparatus of claim 3 wherein the steel shots are picked up at a location with a magnetic field of a first strength and carried across the finned driving wheel which is driven by contact with the side of the wall and is dropped off at a location with a magnetic field of a second strength wherein the first strength is stronger than the second strength.

7. The apparatus of claim 3 wherein the finned driving wheel help to carry or pull the steel shots towards a discharge location and also prevents the steel shot from being pulled back by the magnetic field.

8. The apparatus of claim 3 wherein the steel shots are dropped off at the inner side of the apparatus which will be picked up by the magnetic sweeper apparatus.

9. The apparatus of claim 1 wherein the magnetic sweeper apparatus is configured for continuous discharge.

10. A method of removing metallic debris, using a combined vertical axis rotary clean-off attachment apparatus and a magnetic sweeper apparatus, the method comprising the steps of:

attaching an attachment apparatus to the magnetic sweeper apparatus by a connecting part;

driving the magnetic sweeper apparatus forward or backwards towards a wall;

attracting metallic debris at a bottom of the attachment apparatus by magnetic forces;

picking up and transferring metallic debris by the attachment apparatus with a finned driving wheel;

placing the metallic debris behind the attachment apparatus at a discharge location; and picking up and discharging the metallic debris into a debris bin of the magnetic sweeper apparatus;

wherein magnetic forces are created by a plurality of magnets that create a transition in magnetic field;

wherein the finned driving wheel is a hollow finned wheel driven by contact with a wall, assisting the magnetic field to move metallic debris from the wall side into the magnetic sweeper apparatus' range to be picked up by the magnetic sweeper apparatus.

11. The method of claim 10 wherein the plurality of magnets further comprises rare earth magnets or Ceramic 8 magnets.

12. The method of claim 10 wherein the metallic debris is steel shots.

13. The method of claim 10 wherein the dimensions of the plurality of magnets are 2" length, 1" width and 0.5" height or 0.75" length, 0.75" width and 0.375" height.

14. The method of claim 10 wherein the dimensions of the combined vertical axis rotary clean-off attachment apparatus are 11.81" length, 8.67" width and 3.97" height.

15. The method of claim 12 wherein the steel shots are picked up at a location with a magnetic field of a first strength and carried across the finned driving wheel which is driven by contact with the side of the wall and is dropped off at a location with a magnetic field of a second strength wherein the first strength is stronger than the second strength.

16. The method of claim 12 wherein the finned driving wheel help to carry or pull the steel shots towards a discharge location and also prevents the steel shot from being pulled back by the magnetic field.

17. The method of claim 12 wherein the steel shots are dropped off at the inner side of the combined vertical axis rotary clean-off attachment apparatus which will be picked up by the magnetic sweeper apparatus.

18. The method of claim 12 wherein the magnetic sweeper apparatus is configured for continuous discharge.

* * * * *